Patented Oct. 19, 1937

2,096,103

UNITED STATES PATENT OFFICE 2,096,103

DRY FOOD PRODUCT FROM DISTILLERS' SLOP AND PROCESS FOR MAKING THE SAME

William P. M. Grelck, Baltimore, Md.

No Drawing. Application May 29, 1936, Serial No. 82,456

1 Claim. (Cl. 99—5)

Distillers' slop as discharged from the alcohol distilling apparatus is the de-alcoholized fermented mash from grains such as corn or rye and grain malt, more or less diluted with condensed water from steam for heating and cooking the mash in the still. It contains mainly the non-fermentable grain and malt material of from 3½% to 7% solids. About ⅓ of these solids consists of the fibrous particles of the fruit and seed shell of the grains and grain malt used in the mash suspended in the slop, the remaining solids are in soluble or colloidal form. All of the solids are of great nutritional value, including about 0.4% lactic acid; the latter produced by the action of lactic acid bacteria makes the slop very palatable and of buttermilk like taste so that practically all animals relish distillers' slop when fresh.

The object of my invention is to remove the surplus moisture from the fresh slop so as to preserve the suspended and dissolved solids in dry form by first removing its suspended fibrous solids by retaining or separating them by passing the slop over an 80 to a 100 mesh screen, then removing additional moisture from said retained suspended moist fibrous solids by subjecting them to pressure so as to retain a moisture content of about 70% and then grinding the same to a fine paste. The remaining fluid, containing the dissolved solids and a small amount of the suspended solids which passed through the screen, is collected and concentrated by removing part of its moisture in vacuo by the multiple effect or other economical means to about ¼ to ⅕ its original volume; the concentrated semi-fluid liquid is now intimately mixed with the previously finely ground separated screenings so that the total mass is now only about ⅕ of its original volume, about 80% of its original moisture has been removed by evaporation in vacuo, the paste like fluid is then drawn into a pump and discharged from the same under pressure, and while under pressure heated to a temperature above boiling point to 240 degrees F. and then sprayed into the top of a vertical chamber, constructed of sufficient height, against a current of hot gas, and exposing the sprayed food material a sufficient length of time to the hot gas by drop in the vertical drying chamber so that the fibrous particles are fully dried. In my Patent No. 2,009,134, July 23, 1935, I describe that a vertical chamber 70 to 80 feet high, preferably round, of about 12 feet diameter will give the sprayed food material sufficient time to dry when sprayed from the top into the chamber against the rising hot gas which enters near the bottom of the chamber and escapes through the top of the chamber. The dried solid food material falls to the bottom of the chamber. The chamber may have a funnel shaped bottom extension so that the dried food material is collected below the entrance of the hot gas. The height of the chamber is such as to produce draft, in fact the action is similar to that of a smoke stack. The hot gases as they travel from the bottom inlet upwards, absorb gradually the moisture from the sprayed material as it drops so that the hot gases are practically saturated with moisture when escaping from the top of the drying chamber. This method of drying is highly economical and preserves the nutritional qualities of the food material to be dried to the fullest extent possible because the lowest temperature is maintained at the top outlet of the chamber and thereby guards the food material to be dried against destruction by exposure to excessive heat. This condition is maintained throughout the drying chamber as the temperature increases towards the bottom of the drying chamber while the moisture content of the food material to be dried, decreases. By this action the nutritional qualities of the food material are greatly preserved.

I further find that distillers' slop is dried more economically by spraying the same as described, at a temperature above the boiling point at about 240 degrees F., this has the effect of cutting down the time of drying the fine fibrous particles and expand said particles when released from pressure. These expanded fibrous particles become porous and thus release their moisture more quickly, making the dry product more porous and brittle, which in turn has the effect when fed to animals that it absorbs the gastric juices more quickly and thoroughly, thereby increasing its digestibility. Large distilleries making their own power have abundant exhaust steam available and of sufficient quantity to evaporate up to 80% by weight of their total distillers' slop economically by operating multiple effect evaporating apparatus. Under such condition such surplus moisture is evaporated at a considerable less fuel cost as compared with the direct heat supply required for evaporating the total moisture in the drying chamber and such pre-evaporation of the greater part of the moisture from the screened slop has the further advantage that it increases the output of the drying chamber from 3 to 4 times.

My invention further relates to the grinding of the suspended fibrous particles separated from the slop, to a smooth semi-solid paste and mixing the said paste with the remaining concentrated fluid, then subjecting said semi-fluid mixture to pressure, heating the same above the boiling point of water while under pressure, then spraying the mass into the top of a vertical drying chamber for drying the same. Said drying chamber is constructed of sufficient height to allow a drop of several seconds for the sprayed prepared slop material so that its fibrous particles are fully dried. The dried food material is then removed from the bottom of the drying chamber, packed in meal form and sold as a food.

I further find that an unusually high degree of palatability is imparted to the dried product because as the moisture is removed within the drying chamber from the sprayed slop material, the lactic acid also changes from the acid form to its anhydride or its anhydrous form, it thereby loses its acid character as such but imparts a fine lactic acid like flavor to the finished product.

In practicing my invention I prefer to proceed for example as follows: I take about 1000 gallons or 8000 lbs. of fresh preferably hot distillers' slop from corn or rye mash containing all of the non-fermentable residue, suspended and dissolved, as discharged from the still. Such slop normally contains from 4% to 7% total solids, including lactic acid, 1/3 of said solids consists of suspended fibrous particles, the remainder consists of dissolved or colloidal solids. The slop is then passed over a suitable screen arrangement of from 80 to 100 mesh for separating the wet suspended fibrous particles from the slop, then further subjecting said fibrous particles or screenings to pressure by a suitable arrangement so as to further reduce their moisture content so that said screenings contain about 70% moisture, resulting in a yield of from 500 to 550 lbs., then grinding said screenings to a cream like paste by means of an attrition mill or other suitable grinder. The fluid passing through the screen together with that pressed off from the collected screenings, about 7450 lbs., containing the dissolved or colloidal solids and such amounts of fibrous solids as pass through the screen, is now concentrated in vacuo or other suitable means to from 1/4 to 1/8 of its original volume so as to contain from 14% to 20% total solids, resulting in about 1500 lbs. The original content of lactic acid is concentrated from 0.4% to about 2%. The concentrated liquid is now in the form of a heavy fluid and is added to the previously finely ground screenings, making a total mass of about 2050 lbs. or about 1/5 of its original volume. The mass is well mixed in a suitable container with stirring arrangement or said paste and said concentrated fluid may be mixed in its proper proportion as described, by a continuously operating suitable device. The mass is then drawn by suction into a pressure pump, discharged from said pump into a pipe line under pressure of from 60 lbs. to 100 lbs., said pipe line is exposed to heat by a suitable arrangement so that the mass while passing through the same, may be heated to a temperature above the boiling point of water to 240 degrees F. and is then at such pressure and temperature sprayed into the top of a drying chamber. A suitable spray or a plurality of the same is fitted at the top of the drying chamber. The drying chamber is of the vertical type, preferably round, about 70 to 80 feet high, about 12 feet diameter, however said dimensions may very, fitted with a hot air inlet at or near the bottom so that the hot gases may rise by natural draft against the prepared slop material sprayed from the top of the drying chamber downward so that the hot gases absorb the moisture of the sprayed slop material gradually as it rises and escapes practically saturated with moisture through an opening at the top of the drying chamber into the atmosphere. The amount and temperature of hot gas drawn or forced through the drying chamber and the amount of the finely ground food material sprayed against the hot gas rising within the drying chamber is so timed and regulated that practically all of the moisture from the sprayed food material is absorbed by the rising hot gas when it reaches the bottom of the drying chamber. The bottom of the drying chamber may be fitted with a funnel shaped extension so that the dried food material is collected below the hot gas inlet. The height of the drying chamber is such that the finely ground fibrous particles are exposed a sufficient length of time while dropping from the top to the bottom of the chamber against the current of hot gas so that they are fully dried. It will be noted that the materials which have been finely comminuted contain fibrous particles and said fibrous particles require a longer period for drying than the dissolved or juicy material. The heated column of gas which passes upwardly through the drying chamber, has its highest temperature at the lower end of the drying chamber where said hot gas emerges from an inlet placed somewhat about the bottom of it. At the upper end of the drying chamber where the materials are sprayed, the temperature is lowest due to the evaporation and subsequent absorption of heat by the moisture in the sprayed material. The moisture saturated hot gas may be screened when passing out of the drying chamber to remove any particles of dried material and return said particles to the collected dried material at the bottom of the drying chamber. The dried food material collected at the bottom of the drying chamber is then removed by a suitable conveyer or other arrangement, then graded by passing it through a pulverizer, and it is then cooled and packed in bags or other suitable containers, to be sold as a food.

What I claim as new is:

The method of producing a dry food product from distillers' slop, in which the fibrous particles are in porous and brittle form by the steps of separating the suspended fibrous particles from the slop so as to contain 70% moisture, then concentrating in vacuo the remaining fluid by removing from the same from 60% to 80% of its moisture, then recombining said concentrate with the previously separated moist fibrous solids, then grinding the same to a smooth paste, then heating said paste while under pressure to approximately 240 degrees F., then spraying the same in contact with a column of heated gas into a confined space, causing the fibrous particles to expand, the heated moisture absorbent gas being supplied at a point considerably below the point where the semi-fluid paste is sprayed into the rising column of heated gas, so that the particles of said prepared distillers' slop material will fall through the column of heated gas and emerging from said column where the heated gas has the highest temperature, then collecting the dried particles.

WILLIAM P. M. GRELCK.